United States Patent
Cook

(10) Patent No.: US 11,651,353 B1
(45) Date of Patent: May 16, 2023

(54) PLATFORM FOR COORDINATED CREDIT-BASED AND NON-CUSTODIAL DIGITAL ASSET SETTLEMENT

(71) Applicant: Membrane Labs Inc., New York, NY (US)

(72) Inventor: Carson Raymond Cook, Venice, CA (US)

(73) Assignee: Membrane Labs Inc., New York, NY (US)

( * ) Notice: Subject to any disclaimer, the term of this patent is extended or adjusted under 35 U.S.C. 154(b) by 6 days.

(21) Appl. No.: 17/003,658

(22) Filed: Aug. 26, 2020

(51) Int. Cl.
*H04L 9/06* (2006.01)
*G06Q 20/38* (2012.01)
(Continued)

(52) U.S. Cl.
CPC ..... *G06Q 20/3676* (2013.01); *G06Q 20/0658* (2013.01); *G06Q 20/3674* (2013.01);
(Continued)

(58) Field of Classification Search
CPC ........... G06Q 20/3676; G06Q 20/0658; G06Q 20/3674; G06Q 20/381; G06Q 20/38215; H04L 9/0637
See application file for complete search history.

(56) References Cited

U.S. PATENT DOCUMENTS

| 11,049,128 | B1* | 6/2021 | Olson | G06Q 20/02 |
| 2010/0280936 | A1* | 11/2010 | Trickey | G06Q 40/02 705/37 |

(Continued)

FOREIGN PATENT DOCUMENTS

| CN | 110659888 A | * | 1/2020 | |
| WO | WO-2018192931 A1 | * | 10/2018 | |
| WO | WO-2020199703 A1 | * | 10/2020 | G06Q 20/3829 |

OTHER PUBLICATIONS

"State Intellectual Property Office of China Receives China Unicom's Patent Application for a Trading Method and System for Digital Money", Business and Commerce Patent News, Jan. 2020, (Year: 2020).*

*Primary Examiner* — Neha Patel
*Assistant Examiner* — Duan Zhang
(74) *Attorney, Agent, or Firm* — Rimon PC

(57) ABSTRACT

A plurality of computer-based transactions facilitated by each of a plurality of custodians are monitored. A first transaction of the plurality of transactions includes a transfer of an amount of cryptocurrency of a first type by a first counterparty to a second counterparty in exchange for an amount of cryptocurrency of a second, different type. Transaction packages are generated by each counterparty which include requisite information to effect the transfer. A settlement coordinator asynchronously receives (via a computing network) the transaction packages which specify information required to (i) transfer the cryptocurrency of the first type from the first counterparty to the second counterparty on a first blockchain and (ii) transfer the cryptocurrency of the second type from the second counterparty to the first counterparty on a second blockchain. The settlement coordinator after receiving the first request and the second request accesses the first blockchain and the second blockchain to transfer ownership of the cryptocurrency of the first type and the cryptocurrency of the second type to effect the first transaction.

14 Claims, 6 Drawing Sheets

(51) Int. Cl.
*G06Q 20/36* (2012.01)
*G06Q 20/06* (2012.01)

(52) U.S. Cl.
CPC ..... *G06Q 20/381* (2013.01); *G06Q 20/38215* (2013.01); *H04L 9/0637* (2013.01)

(56) References Cited

U.S. PATENT DOCUMENTS

| | | | |
|---|---|---|---|
| 2019/0026821 A1* | 1/2019 | Bathen | G06Q 40/00 |
| 2019/0156301 A1* | 5/2019 | Bentov | G06Q 20/405 |
| 2020/0065803 A1* | 2/2020 | Abouelenin | G06Q 20/36 |
| 2021/0192541 A1* | 6/2021 | Black | H04L 9/3239 |

* cited by examiner

PLATFORM FOR COORDINATED CREDIT-BASED AND NON-CUSTODIAL DIGITAL ASSET SETTLEMENT

TECHNICAL FIELD

The subject matter described herein relates to a platform providing for settlement of digital assets through coordinated transfers on blockchains of varying types between counterparties without the platform having access to the private keys of the parties.

BACKGROUND

The rapid expansion of digital assets (or "cryptocurrencies") as well as the corresponding blockchains on which they are represented has led to two major types of exchanges: centralized and decentralized exchanges. Centralized exchanges are custodial solutions that do not actually utilize the underlying blockchains for trading or settlement. Decentralized exchanges, on the other hand, operate directly through blockchain transactions. However, such blockchains have some disadvantages in that there are still no reliable, institutional-grade solutions that allow trading between assets from different blockchains. As a result, operating costs are higher due to enhanced computing resource consumption. In addition, the user experience for conducting such transactions is poor leading to other inefficiencies.

SUMMARY

In a first aspect, a plurality of computer-based transactions facilitated by each of a plurality of custodians are monitored. A first transaction of the plurality of transactions includes a transfer of an amount of cryptocurrency of a first type by a first counterparty to a second counterparty in exchange for an amount of cryptocurrency of a second, different type. Thereafter, at a pre-defined time or interval, a first request for settlement of the first transaction is initiated by the first counterparty. The first request includes a transaction package encapsulating instructions to transfer the cryptocurrency of the first type from the first counterparty to the second counterparty. User-generated input is received in response to the first request approving the first request for settlement. Approving, in this regard, includes retrieving a first encryption key associated with the first counterparty and the first cryptocurrency type from a remote computer-based wallet and receiving user-generated input via a graphical user interface signing the first encryption key. In addition, at the pre-defined time or interval, a second request for settlement of the first transaction is initiated by the second counterparty. The second request includes a transaction package encapsulating instructions to transfer the cryptocurrency of the second type from the second counterparty to the first counterparty. Subsequently, user-generated input is received in response to the second request approving the second request for settlement. The approving can include comprising retrieving a second encryption key associated with the second counterparty and the second cryptocurrency type from a remote computer-based wallet and receiving user-generated input via a graphical user interface signing the second encryption key. A settlement coordinator asynchronously receives (via a computing network) the transaction packages responsive to the first request and the second request that specify information required to (i) transfer the cryptocurrency of the first type from the first counterparty to the second counterparty on a first blockchain and (ii) transfer the cryptocurrency of the second type from the second counterparty to the first counterparty on a second blockchain. The settlement coordinator after receiving the first request and the second request accesses the first blockchain and the second blockchain to transfer ownership of the cryptocurrency of the first type and the cryptocurrency of the second type to effect the first transaction.

Each transaction package can include a public address of the corresponding counterparty, a public address for such counterparty, and an amount of the corresponding cryptocurrency.

Each transaction package can be signed using a key associated with the corresponding counterparty prior to being received by the settlement coordinator. The settlement coordinator can, in some variations, forward the transaction packages to the corresponding blockchains without modification. The settlement coordinator can connect to an application programming interface (API) of the first blockchain and the second blockchain. The settlement coordinator can confirm completion of the transfer based on a number of block confirmations from each of the first blockchain and the second blockchain being above a pre-defined number. In such scenarios, the settlement coordinator after confirming completion of the transfer can transmit a confirmation package to each of the first counterparty and the second counterparty indicating successful completion of the transfer.

In a interrelated aspect, a plurality of computer-based transactions facilitated by each of a plurality of custodians are monitored. A first transaction of the plurality of transactions includes a transfer of an amount of cryptocurrency of a first type by a first counterparty to a second counterparty in exchange for an amount of currency of a second, different type. Thereafter, at a pre-defined time or interval, a first request for settlement of the first transaction is initiated by the first counterparty. The first request includes a transaction package encapsulating instructions to transfer the cryptocurrency of the first type from the first counterparty to the second counterparty. User-generated input is received in response to the first request approving the first request for settlement. Approving, in this regard, includes retrieving a first encryption key associated with the first counterparty and the first cryptocurrency type from a remote computer-based wallet and receiving user-generated input via a graphical user interface signing the first encryption key. In addition, at the pre-defined time or interval, a second request for settlement of the first transaction is initiated by the second counterparty. The second request includes a transaction package encapsulating instructions to transfer the currency of the second type from the second counterparty to the first counterparty. Subsequently, user-generated input is received in response to the second request approving the second request for settlement. The approving can include comprising retrieving a second encryption key associated with the second counterparty and the second cryptocurrency type from a remote computer-based wallet and receiving user-generated input via a graphical user interface signing the second encryption key. A settlement coordinator asynchronously receives (via a computing network) the transaction packages responsive to the first request and the second request that specify information required to (i) transfer the cryptocurrency of the first type from the first counterparty to the second counterparty on a first blockchain and (ii) transfer the currency of the second type from the second counterparty to the first counterparty. The settlement coordinator after receiving the first request and the second request accesses the first blockchain to transfer ownership of the cryptocurrency of the first type and causes the transfer of the currency of the second type to effect the first transaction.

Causing the currency of the second type to be transferred to the first counterparty can include initiating a transfer of the second currency on a second, different blockchain.

Alternately, causing the currency of the second type to be transferred to the first counterparty comprises: initiating a transfer of the second currency through an electronic funds network. The electronic funds network can include any variety of networks, including, without limitation, ACH, SWIFT, or a peer-to-peer fund transfer network (ZELLE, PAYPAL, VENMO, etc.).

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides advanced settlement techniques which obviate the need for the exchange of private cryptographic user keys. Moreover, the current settlement techniques utilize fewer computing resources such as memory, CPU, and network bandwidth as compared to conventional digital settlement processes.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
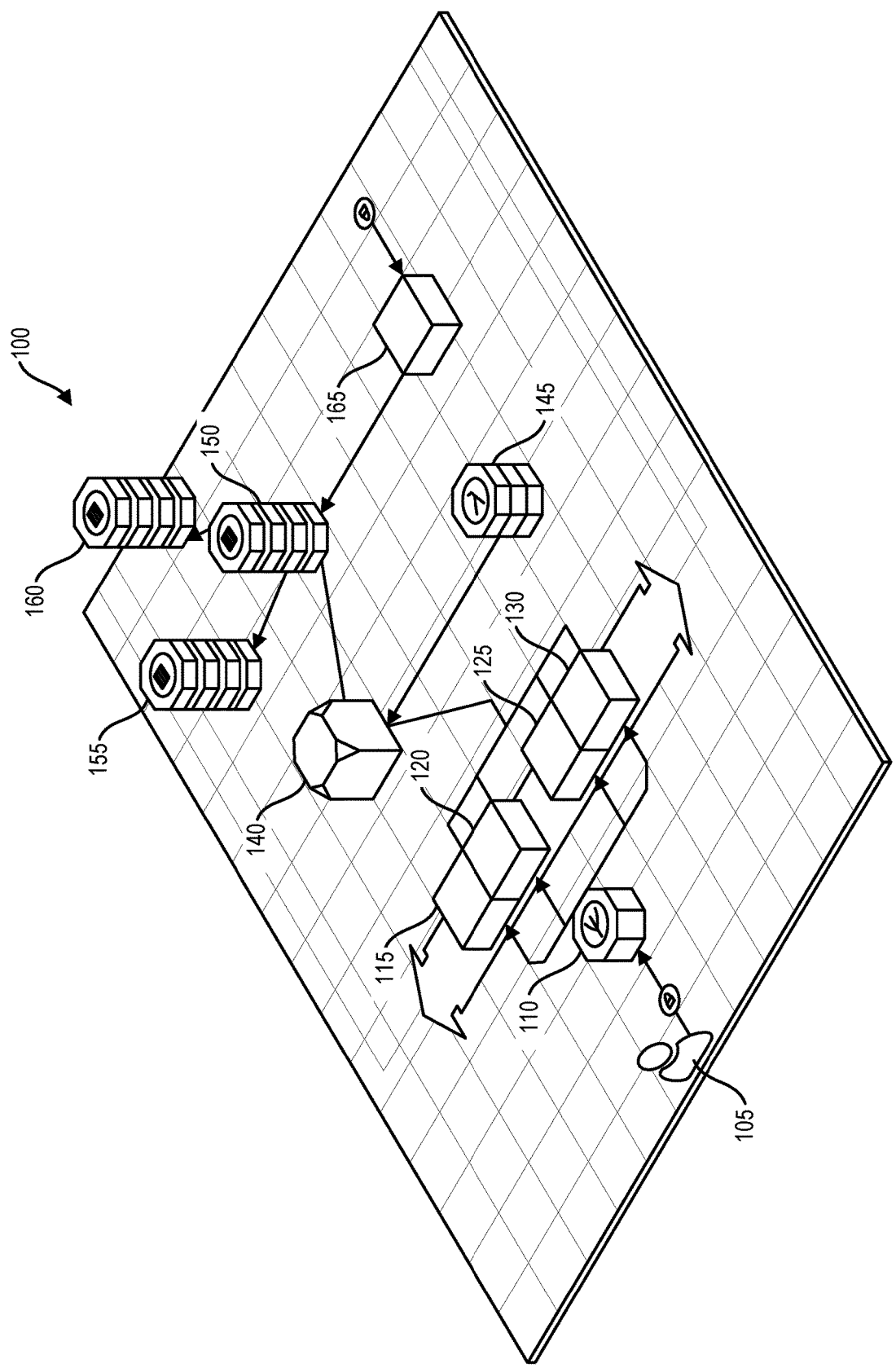
FIG. 1 is a diagram of a first computing architecture for providing coordinated credit-based and non-custodial digital asset settlement.

The current subject matter is directed to an advanced computer-implemented platform providing processes and architectures to facilitate transactions across heterogeneous blockchains. These transactions include trading, clearing, and netting which take advantage of the benefits of both centralized and decentralized trading features, while trying to minimize the weak points. The platform allows counterparties to operate in a decentralized manner, without the need of deposit funds. The platform operator never takes control of the assets of the counterparties.

Trading is regulated by a credit system, which gives flexibility of operation to the different counterparties. At the end of the day, a computer-implemented bank clearing process is carried out and the final matches between counterparties are processed: the minimum amount of transactions necessary for the companies to update their balances (which results in reduced consumption of computing resources such as network bandwidth, memory usages, processor usage, etc.).

The current arrangement is also advantageous in that it allows a user to operate with high frequency of operations without paying costs associated with blockchain transactions, and without the operator ever taking control of the counterparties funds. Indeed, the users' funds remain in custody at their depository of choice throughout the trading process. In practice, this means that a user's fiat assets can be held at a prime brokerage bank (or "bank") and the user's crypto assets can be held at a different digital asset custodian. Users can trade, clear, and settle with other counterparties on the network, regardless of which bank and custodian the other counterparty is on. In addition, the system is agnostic to the blockchain underlying the asset, and provides a unified interface that abstracts the blockchain, bank, and custodian details. Additionally, users can execute trades directly into the platform either via the UI or else programmatically through any other third party trade execution layer that passes trade data along to the system's API. The platform is designed in such a way that the trader does not need to have specific blockchain knowledge when trading, as is required for trading decentralized exchanges.

The current subject matter is directed to techniques for coordinated non-custodial, credit-based clearing, including multilateral netting and matching, and settlement of digital asset trades on the underlying blockchains. Further details governing the netting and matching of digital assets are detailed in co-pending U.S. patent application Ser. No. 17/003,852 filed concurrently herewith and entitled "Efficient Algorithmic Netting and Matching of Digital Assets", the contents of which are hereby fully incorporated by reference. In one approach, these techniques can be implemented utilizing the following modules: a credit manager, implemented as an extra layer in the server that processes orders and trades, and a subatomic netting and matching processes, which are two independent software modules running on a dedicated server. Synchronization between processes can be implemented using cloud computing microservices, for example, clock rules and serverless services that run code in response to events.

FIG. 1 is a diagram 100 illustrating an example process flow in relation to a computing architecture for implementing aspects of the current subject matter. An authenticated user on a client device 105 operates through a web or desktop application that communicates with the backend through an API. API endpoint calls are directed to a load balancer 110 which can distribute load between servers 115, 120, 125 and 130. Servers can be mounted on an architecture such as auto-scaling EBS AWS microservice, which can be configured to add more instances in future depending on the load. Platform data (e.g., account data, trading information, etc.) can be stored in a SQL server 140, and some or all of the trading data can be replicated into a database 150 such as MongoDB database, which can hold two replica sets 155 and 160. These duplicate data sets can be used in two distinct ways. First, the duplication gives redundancy in the event that one database is corrupted for any reason. Second, the databases give two ways of computing the results of the netting and matching to ensure that the results are consistent with the net trading credits and debits. A subatomic module 165 can be configured to perform clearing of transactions. It is referred to as "subatomic" due to its contrasting approach to settlement with atomic matching. In atomic matching, funds transfer both directions between both parties after a single trade. The trade results in both a direct credit and a direct debit for both counterparties. On the other hand, with subatomic matching, trading activity across assets and across counterparties is netted, so that the most efficient matching and transfers of assets occur. This means that a large number of trades can be condensed into a small number of transfers which move at settlement. The subatomic module 165 can be executed on a periodic basis (e.g., once a day at the close of trading, etc.) and can be configured to only consume data from the databases 150. Once the subatomic module 165 processes transactions by executing a set of corresponding tasks that can be executed in order to store the final transactions on the SQL server 140. An additional task execution module 145 can, in response to various non-trading related events on the platform, execute other sets of automated tasks.

Figure 2:
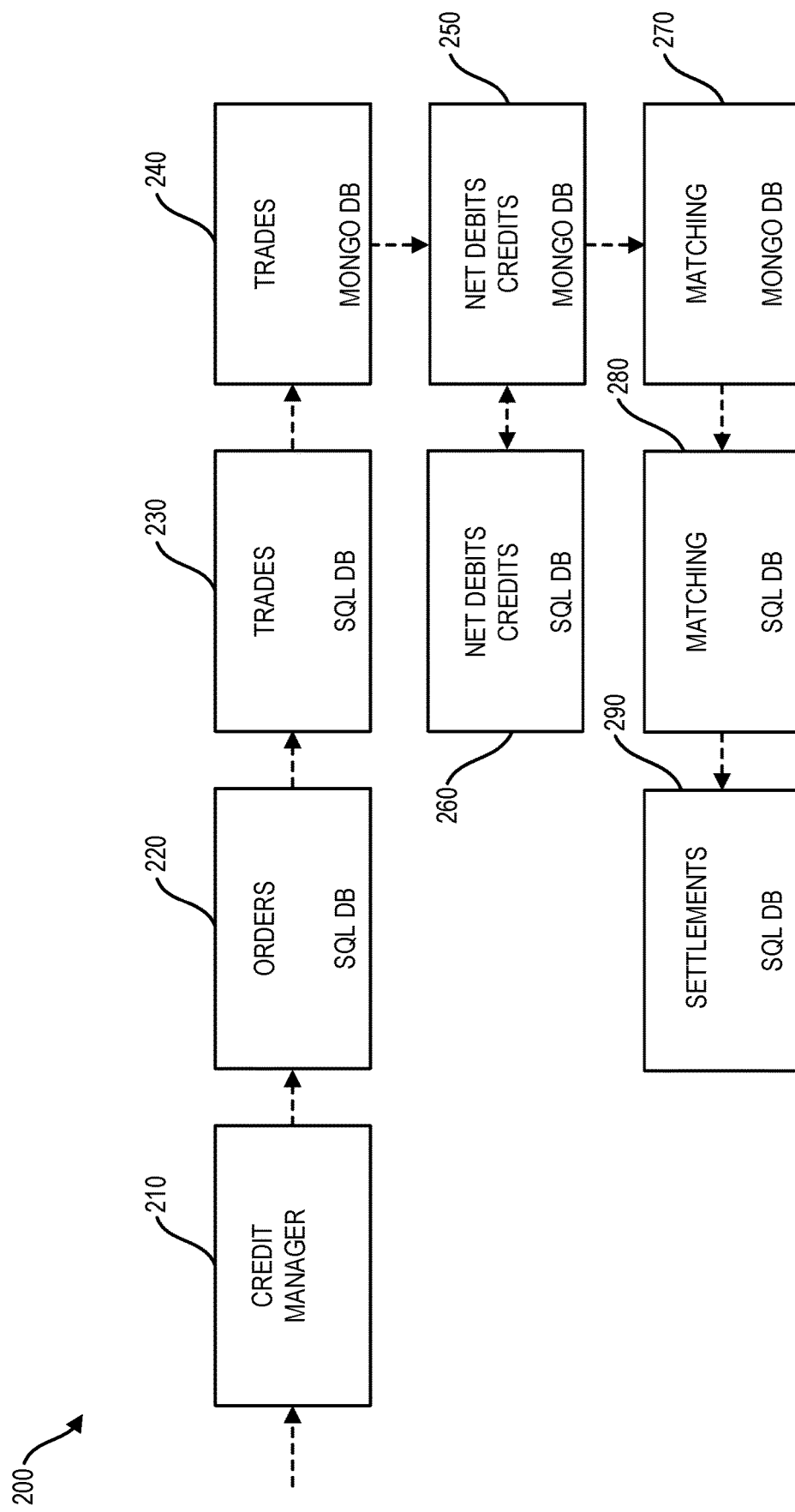
FIG. 2 is a first process flow diagram of a computer-implemented digital asset workflow.

FIG. 2 is a diagram 200 illustrating an example of a computer-implemented trading flow. A credit manager 210 is a computer-based software module that acts as a proxy analyzing whether the user is able to perform the operation. If the action is allowed, it impacts in the orders resources database representation, and further in the trades representation, once the trading proposals are accepted by two counterparties. In particular, the credit manager 210 checks whether users are able to submit trading orders (220) and to accept them. When traders agree on trading proposals that are admitted by the credit manager module, trades 230 are created on the web server database (SQL DB). An intern process replicates the trades into the MongoDB database 240. After Subatomic execution called each day at the trading closing hour, the net debits and credits 250 and matching 270 tables are filled with updated data on the MongoDB database. The first table holds the net balances for each counterparty and each asset, and the second table holds the final transactions that need to be performed in order to zero all debits and credits balances. Both tables are replicated by internal processes into SQL DB tables 260 and 280. Finally, settlements 290 are computed as sets of matches transactions that groups assets and counterparties.

Figure 3:
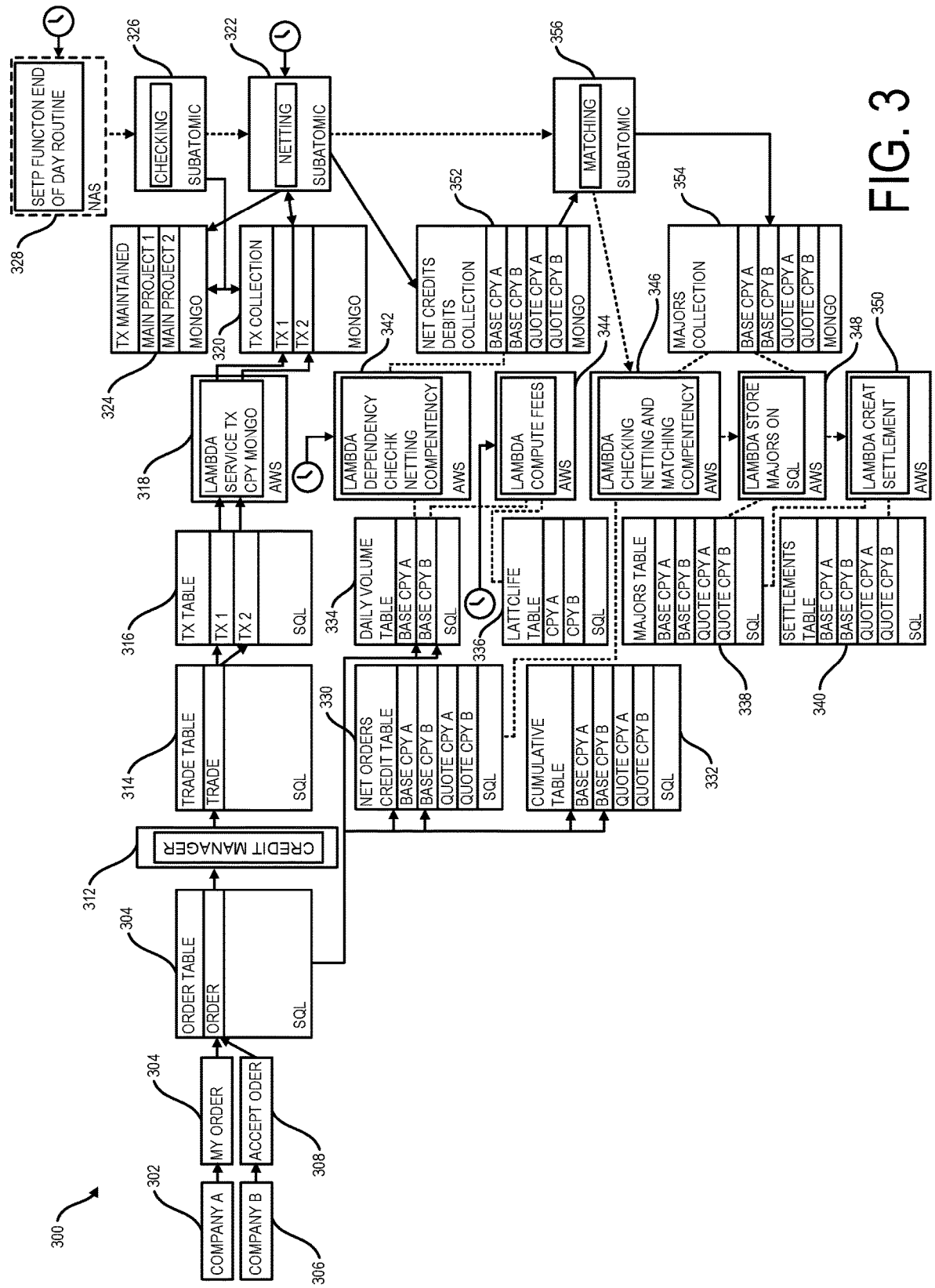
FIG. 3 is a second process flow diagram of a computer-implemented digital asset workflow.

FIG. 3 is a diagram 300 illustrating a more detailed computer-implemented trading information flow as provided in FIG. 2. Company A 302 submits an order 304 which is stored in the order table. Company B 306 accepts the order in the 308 schema. Both processes, creating a new order and accepting a previous one, are evaluated by the credit manager 312 (such as credit manager 210 or a different software-based module can confirm whether the proposed computer-based trading transaction is permitted), which checks if both companies have enough asset available credit, overall available credit and counterparty available credit with each other. The credit manager 210 can accomplish this by tracking three types of available credits for each company. The asset available credit is tracked for each asset type on the system, and is debited or credited any time a company trades that asset. The overall available credit is set by the network and determines the maximum position the company can take across all assets, marked back to the USD equivalent using the current market price of each asset. Finally, the counterparty available credit determines how much trading a company can do with each other company. The overall available credit is stored as a single floating point number, while the asset available credits and counterparty available credits are stored as arrays of floating point numbers, mapped to the assets and other companies (counterparties). The credit manager 120 can check all of the available credits at the time of a trade to ensure that the trade can occur. If the credit manager 312 indicates that the trade has been accepted, a new entry is created in the trade table 314. Each trade can be composed by two transactions as one company debits the quote asset (e.g., a cryptocurrency of a first type and/or a different source of funds) and the other debits the base asset (e.g., a cryptocurrency of a first type and/or a different source of funds). Both transactions are stored in the tx table 316, and a lambda process 318 replicates the data into the tx collection 320 in a MongoDB database. The module 324 checks which of those transactions were processed by the netting module 322, which can be executed on a periodic basis (e.g., each 5 minutes) to update the net debits and credits balances for each company and asset, which are stored on collection 352. Each day, at the trading closing hour, the step function 328 called "End Of Day Routine" is executed. The routine can include a set of functions that are called in order: first at all, the netting 322 and checking 326 functions are called to ensure that company balances are updated. The lambda redundancy process 342 is called after, to check that computed net credits and debits on Subatomic modules are consistent with computed net debits and credits 330. After this process, lattice platform fees are computed based on daily volumes table 334. Then, the matching function is called, which computes final matchings and stores them on matching collection 354. The lambda checking netting and matching consistency 346 process is called then, which ensures consistency between matches calculation and netting balances stored on SQL server in table 330. The lambda store matches on SQL process 348 replicates the final matchings data from MongoDB to the SQL table 338. Finally, the last lambda process 350 computes the daily settlements and stores them in the table 340, which are sets of matches grouped by counterparties and assets.

Figure 4:
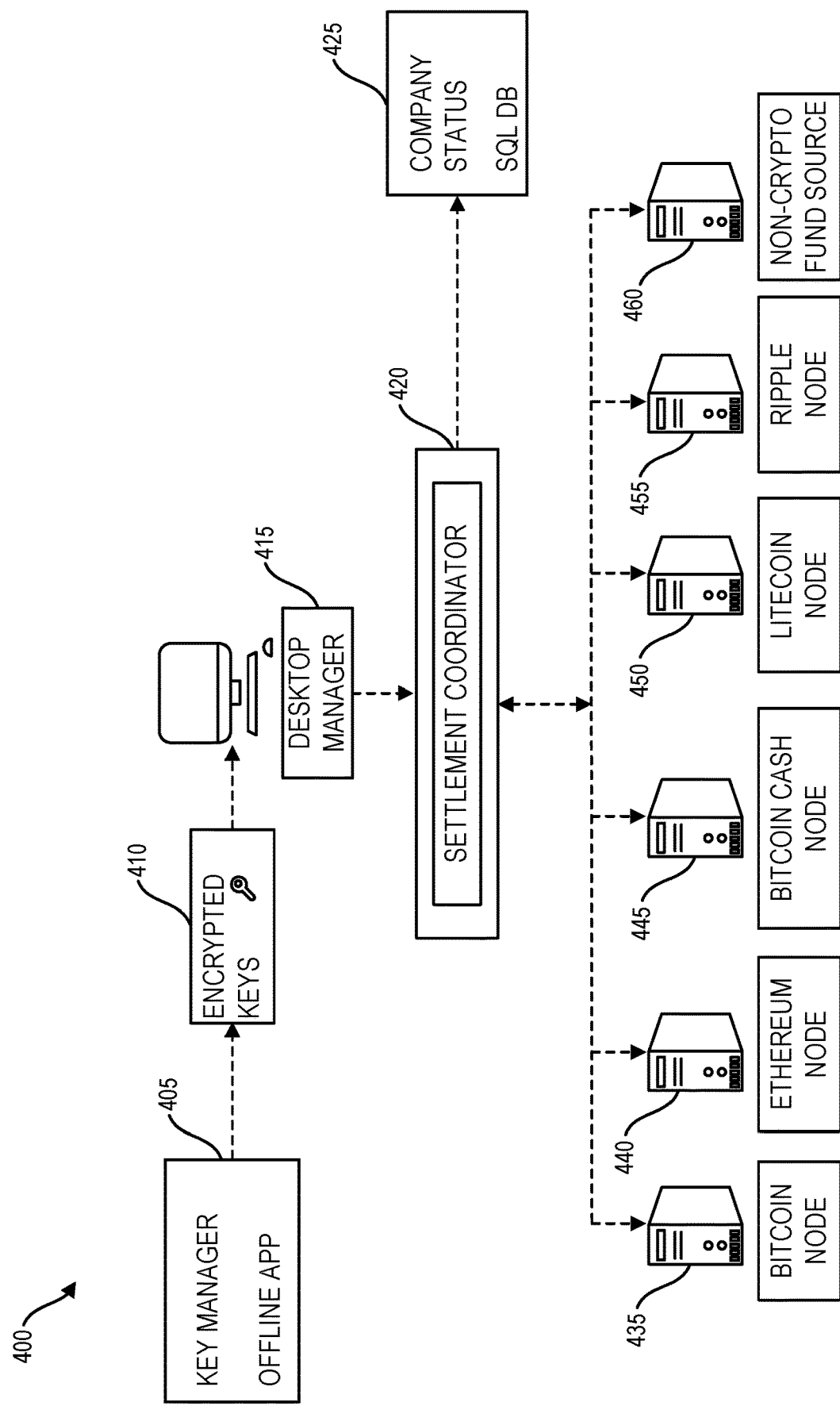
FIG. 4 is a diagram of a second computing architecture for providing coordinated credit-based and non-custodial digital asset settlement.

FIG. 4 outlines settlements payments flow. The manager in charge of the operation is authenticated in the desktop manager 415 (a software module executing on a local computing device), and unlocks the company wallet using the encrypted keys 410 which are stored in a file previously created with a keystore application 405. The keystore application 405 can be maintained offline so that the bank or custodian in charge of managing the private keys associated with the company wallet never has to expose the private key to any third parties including the Internet at large. It is of crucial importance that the bank/custodian is the only holder of the private key, and this offline app 405 allows them to hold the key, interact with the rest of the system, and send blockchain transfers in a way that never compromises their security of the private key. The desktop manager 315 retrieves settlement transaction package from a web server 425 and the desktop manager 415 accepts the required payments and signs the settlement transaction package with the encrypted keys 410. The settlement transaction package can include the public address of the sender, the public address of the recipient, the asset, and amount of the asset to be transferred. This information can be included for each asset that the company is transferring to another company. The transaction package can be formatted for each underlying blockchain (e.g. Bitcoin, Ethereum, Ripple, Litecoin, Bitcoin Cash, etc). Once the transaction package is signed using the encrypted key, the signed transaction packages are not submitted to the blockchain, but to a settlement coordinator 420 (an intermediate software module executing on a different, remote computing device or devices), which prevents sending the corresponding transaction packages to the corresponding blockchain before the beneficiary companies submit their own transaction packages. If a company does not submit its transaction packages before a limit hour, the settlement coordinator 420 can lock the future trading activity for that company, updating the company status in a SQL table 425. Once the settlement coordinator checks 420 that a given transaction is allowed to be sent to the blockchain, it communicates with the corresponding blockchain node (e.g., nodes 435-455) and submits the transaction package. Payments confirmations depend on blockchain mining speed. The settlement coordinator 420 can directly communicate with each blockchain 435-455 in order to query for and receive these confirmations. The settlement coordinator 420 accomplishes this by connecting to the API of each blockchain 435-455. In some cases, one of the transaction packages may specify payment from a non-cryptographic currency source such as a bank. In such cases, the settlement coordinator 420 may send the transaction package to a node 460 that is associated with such other payment source.

Referring again to FIG. 4, the person in charge of actually sending the payment transfers, from now on the custodian manager, logs into the desktop manager application 415 with his or her credentials to download the daily settlements. Before approving the settlements, the custodian manager enters the encryption password that allows the desktop application to sign the transactions using the private key which is required to use his or her blockchain wallets. It has been previously encrypted through a secure application in which you could register your keys in an environment without internet connection (i.e., the keystore application 405, etc.). The custodian manager enters the private key into the keystore application 405, and encrypts the private key using an encryption password within the keystore application 405. The desktop application later hands any transaction packets over to the keystore application 405 in order to sign, and the custodian manager enters the encryption password to allow the keystore application 405 to sign using the private key. When the custodian manager submits the transaction packages, they are processed by the settlement coordinator 420, which ensures to hold the signed transactions encapsulated within the transaction packages until the beneficiary counterparty submits its corresponding transaction package as well. In this way, no counterparty sends their funds until they are guaranteed to receive the funds of the other counterparties. Once the settlements are approved, the settlement coordinator 420 automatically and without human intervention sends the signed transactions to the corresponding blockchain nodes (435-455). The signed transaction packages received by the settlement coordinator 420 from the desktop manager 415 is not altered in any way. Rather the settlement coordinator 420 is configured to delays sending these transaction packages to the blockchains 435-455 until all have been received. In this way, this architecture can ensure that no funds move over the blockchain until all transfers have been approved. This removes the counterparty risk of any individual company not sending their assets owed. The double arrow in the diagram indicates that the settlement coordinator 420 can wait for the transactions to be mined, i.e. included in the blockchain records with the number of confirmations required to statistically ensure that the transaction will not be discarded under any possible blockchain run condition scenarios. The number of confirmations, known as block confirmations, required for a guarantee of validity varies for each blockchain. The settlement coordinator 415 communicates with each blockchain through the API, and checks to see if the number of block confirmations from the blockchain network is above or below the critical block confirmation number of that blockchain. Once the settlement coordinator 415 confirms that the transaction has been mined with enough block confirmations, it can update the company status at the web server 425.

In addition to digital assets moving as described above, the platform also coordinates the movement of fiat via WIRE/SWIFT between banks in the same process using a different node 460. In this case, the flow occurs as follows: the settlement coordinator delivers a WIRE/SWIFT-formatted message to the desktop application at the bank/custodian. Due to the nature of WIRE submission, it is the responsibility of the bank to send the message along to the WIRE network (e.g. Fedwire). Once the message has been submitted to the WIRE network, the bank/custodian will receive a confirmation message back from the WIRE network, which it will then pass along to the settlement coordinator via the desktop application. At this point, the settlement coordinator 420 acknowledges that the settlement via WIRE/SWIFT has been submitted.

Each user of the platform, be it a bank, a fund or bank client or an exchange (from now on we will call it a counterparty) can have three types of credit limits that are managed by the credit manager 210: (i) per asset credit limit, (ii) overall credit limit, and (iii) counterparty credit limit. Limits in this regard can be user-defined and variable. In some instances, the limits can be different for each type of credit limit. All of these limits can be maintained and tracked in the credit manager 210 module.

The per asset credit limit can computed on a specific asset (e.g, a currency such as USD, BTC, ETH, BCH, LTC, XRP, etc.). The difference between the credit limit and the used credit is called the available credit. If a counterparty receives credit in a given asset, its updated available credit in the credit manager 210 can become higher than the initial credit limit. On the other hand, if the counterparty debits the asset, its updated available credit is smaller than the initial credit limit. For example, considering BTC as the asset, the available credit calculation is made in the following way:

$$BTC_{available} = BTC_{limit} - BTC_{used}$$

where $BTC_{limit}$ is the total credit limit per asset and $BTC_{used}$ is computed as the net credits/debits balance. In this equation, used would be positive if a debit and negative if a credit.

The overall credit limit can be computed in a standard asset type such as USD dollars. Availables can be either positive or negative, but never above the overall credit limit. The available calculation for a given counterparty is made using the following rule:

$$Overall_{available} = Overall_{limit} - \sum_{assets} \left( asset_{used>0} \cdot last_{asset/USD} \right)$$

where $Overall_{limit}$ is the overall limit, $asset_{used>0}$ computed as the net credits/debits balance for each asset, but only for assets with a negative balance, and $last_{asset/USD}$ is the last market value (taken from COINBASE or another major exchange) of the considered asset in USD dollars.

When the credit manager 210 receives a new order, (or needs to approve an existing order), it compares a baseline value (e.g., the USD value) of the amount of the assets that need to be debited against the overall available credit. If the computed quantity is lower than the overall available, the credit manager approves the action: sets a new order or approves a proposed trade. That is, the credit manager 210 can make decisions based on the initial state of the credit and not on the final state. The overall credit limit can go negative because of the contribution of the term $last_{asset/USD}$, which fluctuates over time.

The counterparty credit limit can be computed in a standard asset type such as USD dollars. The availables can be positive or negative, but never above the limit. This kind of credit affects only the relation between two counterparties. Each counterparty has a credit limit in relation to each other in the system. Available credit calculation for a given counterparty against another counterparty is made using the following rule:

$$Counterparty_{available} = Counterparty_{limit} - \sum_{assets} (asset_{counterpartyused>0} \cdot last_{asset/USD})$$

where $Counterparty_{limit}$ is the overall credit limit with a given counterparty, $asset_{counterparty\ used>0}$ is computed as the net credits/debits balance, for each asset traded with a given counterparty, but only for assets with negative balance, and $last_{asset/USD}$ is the last market value (taken from Coinbase or another major exchange) of the considered asset in USD dollars.

Referring again to FIG. 1, the subatomic component 165 can perform clearing each trading day at closing time, for example, at 15:00 hs ET. The subatomic component 165 can process the trade execution data: a ledger dataset of each trading operation are decomposed into two different transactions, one for the quote and another for the base asset in each market pair traded. Each dataset entry includes the asset transacted, the debitor counterparty, the creditor counterparty, the quantity and the timestamp of the operation. Its purpose is to minimize the amount of final transactions that need to be performed on blockchain in order to pay off all debts, optimizing the costs associated with transactions. Subatomic is composed of two main algorithms: netting and matching. The netting algorithm occurs in both the SQL database 260 and the Mongo database 250, or equivalents. The netting algorithm converts the trade execution data into net credits and debits for each counterparty. It is computed online in a database connected to the web server every ten minutes in the subatomic module. The two processes are independent and their results are compared frequently by an external process, making the system more robust. The matching algorithm is executed once per day at closing hour in the matching modules 270 and 280, and finds the most efficient net transfers between the counterparties in order to perform the clearing process. All of the above flow results in settlement instructions which are executed by the settlement coordinator 420.

Figure 5:
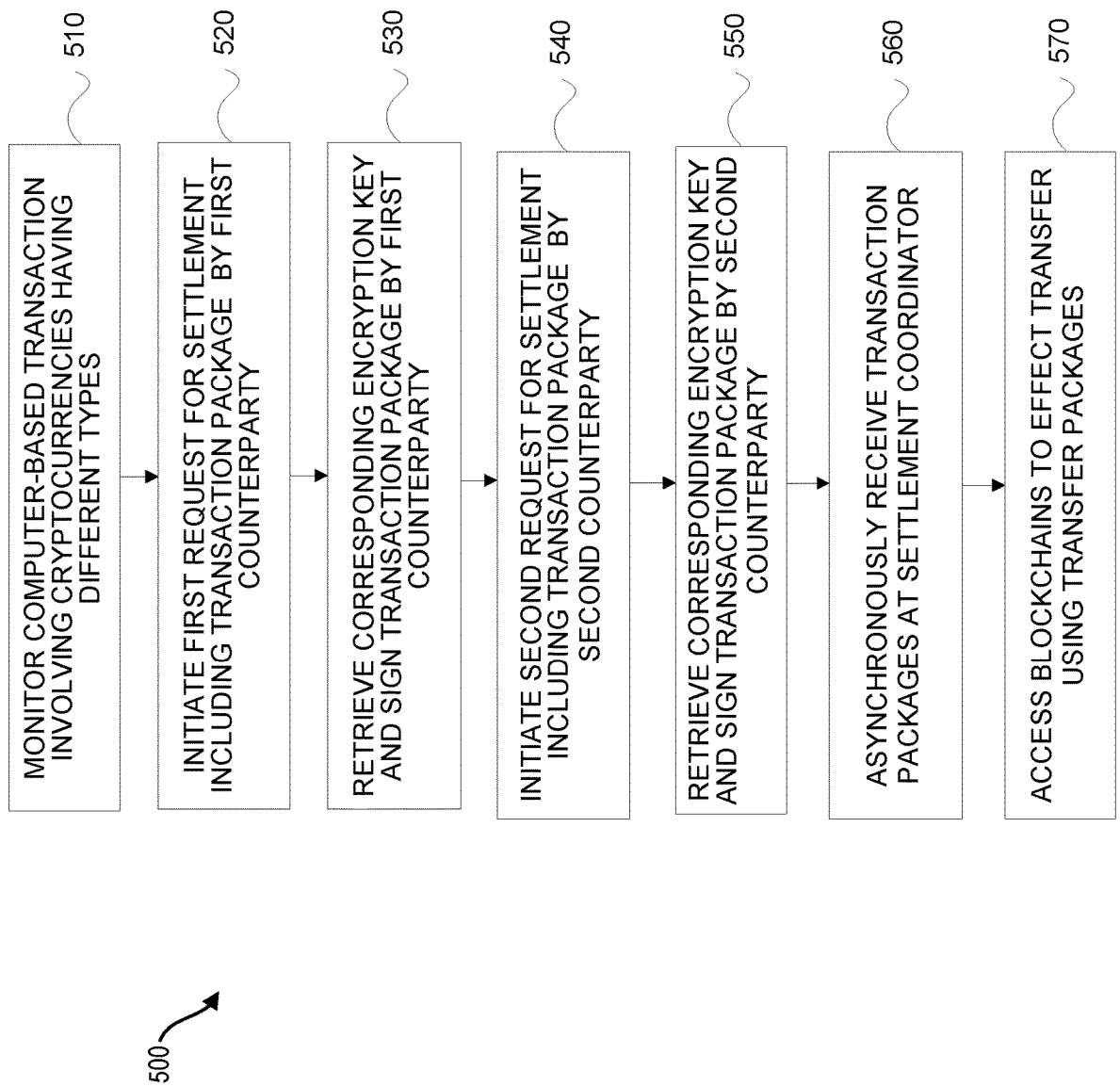
FIG. 5 is a third process flow diagram for coordinated credit-based and non-custodial digital asset settlement.

FIG. 5 is a diagram 500 in which, at 510, a plurality of computer-based transactions facilitated by each of a plurality of custodians are monitored. A first transaction of the plurality of transactions includes a transfer of an amount of cryptocurrency of a first type by a first counterparty to a second counterparty in exchange for an amount of cryptocurrency of a second, different type. Thereafter, at 520, at a pre-defined time or interval, a first request for settlement of the first transaction is initiated by the first counterparty. The first request includes a transaction package encapsulating instructions to transfer the cryptocurrency of the first type from the first counterparty to the second counterparty. User-generated input is received, at 530, in response to the first request approving the first request for settlement. Approving, in this regard, includes retrieving a first encryption key associated with the first counterparty and the first cryptocurrency type from a remote computer-based wallet and receiving user-generated input via a graphical user interface signing the first encryption key. In addition, at the pre-defined time or interval, at 540, a second request for settlement of the first transaction is initiated by the second counterparty. The second request includes a transaction package encapsulating instructions to transfer the cryptocurrency of the second type from the second counterparty to the first counterparty. Subsequently, at 550, user-generated input is received in response to the second request approving the second request for settlement. The approving can include comprising retrieving a second encryption key associated with the second counterparty and the second cryptocurrency type from a remote computer-based wallet and receiving user-generated input via a graphical user interface signing the second encryption key. Later, at 560, A settlement coordinator asynchronously receives (via a computing network) the transaction packages responsive to the first request and the second request that specify information required to (i) transfer the cryptocurrency of the first type from the first counterparty to the second counterparty on a first blockchain and (ii) transfer the cryptocurrency of the second type from the second counterparty to the first counterparty on a second blockchain. The settlement coordinator after receiving the first request and the second request, at 570, accesses the first blockchain and the second blockchain to transfer ownership of the cryptocurrency of the first type and the cryptocurrency of the second type to effect the first transaction.

Figure 6:
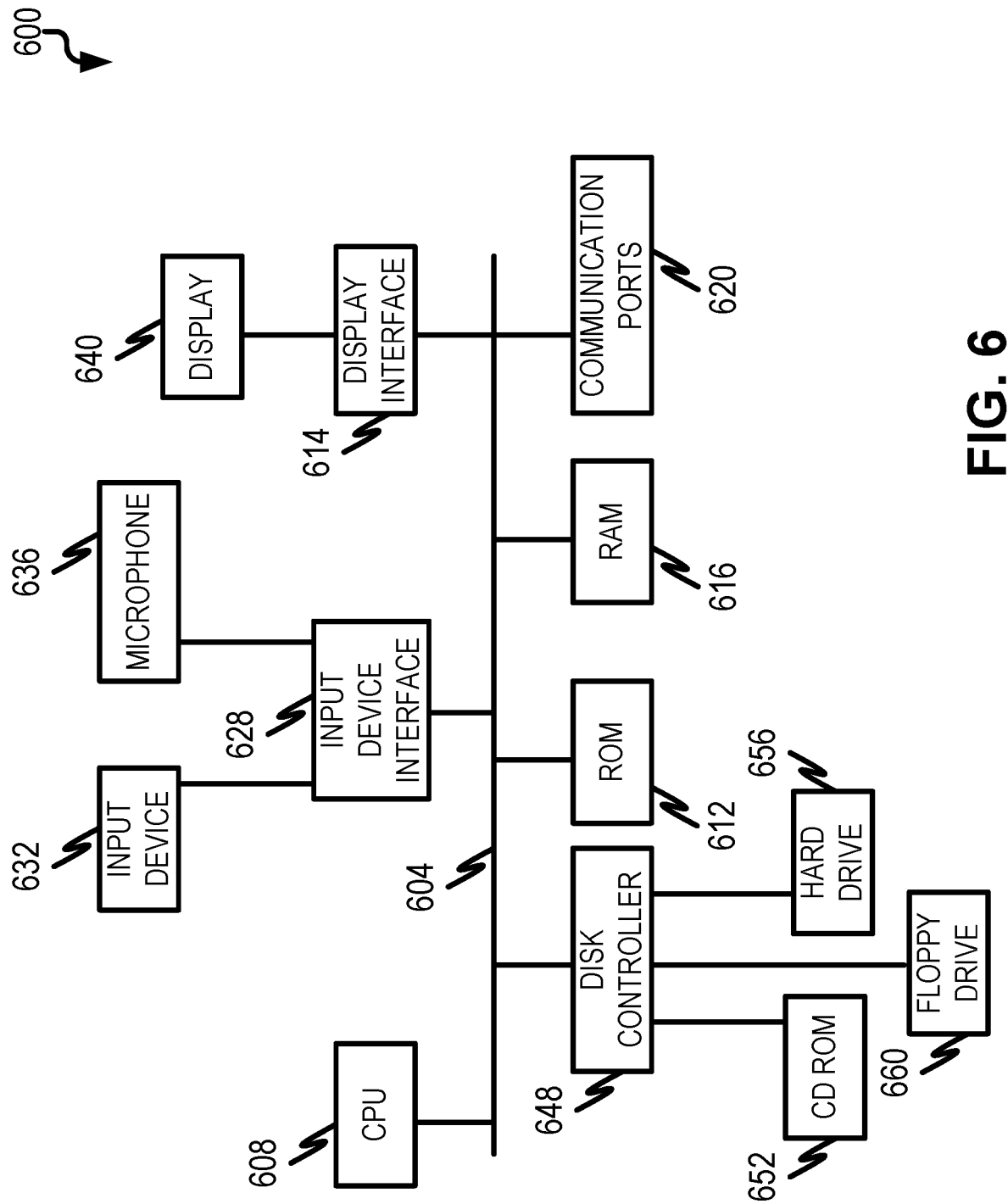
FIG. 6 is a diagram illustrating a computing device for implementing aspects of the current subject matter.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface with one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the at least one communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 via a display interface 614 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
monitoring, by an off-chain transaction manager, a plurality of computer-based transaction requests facilitated by each of a plurality of custodians, a first transaction request of the plurality of transaction requests specifying a transfer of an amount of cryptocurrency of a first cryptocurrency type by a first counterparty to a second counterparty in exchange for an amount of cryptocurrency of a second, different, cryptocurrency type, wherein the first cryptocurrency type is traded on a first blockchain using a first protocol and the second cryptocurrency type is traded on a second blockchain using a second protocol that is different from the first protocol;
initiating, by the off-chain transaction manager and at a pre-defined time or interval, a first request for settlement of the first transaction by the first counterparty, the first request for settlement comprising a first transaction package encapsulating instructions to effect a first sub-transaction transferring the cryptocurrency of the first cryptocurrency type from the first counterparty to the second counterparty;

receiving user-generated input in response to the first request for settlement approving the first request for settlement, the approving comprising retrieving a first encryption key associated with the first counterparty and the first cryptocurrency type from a remote computer-based wallet and receiving user-generated input via a graphical user interface signing the first encryption key;

initiating, by the off-chain transaction manager and at the pre-defined time or interval, a second request for settlement of the first transaction by the second counterparty, the second request for settlement comprising a second transaction package encapsulating instructions to effect a second sub-transaction transferring the cryptocurrency of the second type from the second counterparty to the first counterparty;

receiving user-generated input in response to the second request for settlement approving the second request for settlement, the approving comprising retrieving a second encryption key associated with the second counterparty and the second cryptocurrency type from a remote computer-based wallet and receiving user-generated input via a graphical user interface signing the second encryption key;

asynchronously receiving, from the off-chain transaction manager and by an offchain settlement coordinator, over at least one computing network, the first and second transaction packages; and accessing, by the settlement coordinator after receiving the first and second transaction requests, the first blockchain and the second blockchain to transfer effect the first sub-transaction on the first blockchain and to effect the second sub-transaction on the second blockchain to thereby accomplish the first transaction.

2. The method of claim 1, wherein each of the first and second transaction package comprise a public address of the corresponding counterparty, a public address for such counterparty, and an amount of the corresponding cryptocurrency.

3. The method of claim 1, wherein each of the first and second transaction package is signed using a key associated with the corresponding counterparty prior to being received by the settlement coordinator.

4. The method of claim 3, wherein the settlement coordinator forwards the transaction packages to the corresponding blockchains without modification.

5. The method of claim 4, wherein the settlement coordinator connects to an application programming interface (API) of the first blockchain and the second blockchain.

6. The method of claim 5 further comprising:
confirming, by the settlement coordinator, completion of the transfer based on a number of block confirmations from each of the first blockchain and the second blockchain being above a pre-defined number.

7. The method of claim 6 further comprising:
transmitting, by the settlement coordinator after confirming completion of the transfer, a confirmation package to each of the first counterparty and the second counterparty indicating successful completion of the transfer.

8. A system comprising:
at least one data processor; and
memory storing instructions which, when executed by at least one computing device, result in operations comprising:
monitoring, by an off-chain transaction manager, a plurality of computer-based transaction requests facilitated by each of a plurality of custodians, a first transaction request of the plurality of transaction requests specifying a transfer of an amount of cryptocurrency of a first cryptocurrency type by a first counterparty to a second counterparty in exchange for an amount of cryptocurrency of a second, different, cryptocurrency type, wherein the first cryptocurrency type is traded on a first blockchain using a first protocol and the second cryptocurrency type is traded on a second blockchain using a second protocol that is different from the first protocol;

initiating, by the off-chain transaction manager and at a pre-defined time or interval, a first request for settlement of the first transaction by the first counterparty, the first request for settlement comprising a first transaction package encapsulating instructions to effect a first sub-transaction transferring the cryptocurrency of the first cryptocurrency type from the first counterparty to the second counterparty;

receiving user-generated input in response to the first request for settlement approving the first request for settlement, the approving comprising retrieving a first encryption key associated with the first counterparty and the first cryptocurrency type from a remote computer-based wallet and receiving user-generated input via a graphical user interface signing the first encryption key;

initiating, by the off-chain transaction manager and at the pre-defined time or interval, a second request for settlement of the first transaction by the second counterparty, the second request for settlement comprising a second transaction package encapsulating instructions to effect a second sub-transaction transferring the cryptocurrency of the second type from the second counterparty to the first counterparty;

receiving user-generated input in response to the second request for settlement approving the second request for settlement, the approving comprising retrieving a second encryption key associated with the second counterparty and the second cryptocurrency type from a remote computer-based wallet and receiving user-generated input via a graphical user interface signing the second encryption key;

asynchronously receiving, from the off-chain transaction manager and by an offchain settlement coordinator, over at least one computing network, the first and second transaction packages; and accessing, by the settlement coordinator after receiving the first and second transaction requests, the first blockchain and the second blockchain to transfer effect the first sub-transaction on the first blockchain and to effect the second sub-transaction on the second blockchain to thereby accomplish the first transaction.

9. The system of claim 8, wherein each transaction of the first and second transaction package comprise a public address of the corresponding counterparty, a public address for such counterparty, and an amount of the corresponding cryptocurrency.

10. The system of claim 8, wherein each of the first and second transaction package is signed using a key associated with the corresponding counterparty prior to being received by the settlement coordinator.

11. The system of claim 10, wherein the settlement coordinator forwards the transaction packages to the corresponding blockchains without modification.

12. The system of claim 11, wherein the settlement coordinator connects to an application programming interface (API) of the first blockchain and the second blockchain.

13. The system of claim 12, wherein the operations further comprise:
confirming, by the settlement coordinator, completion of the transfer based on a number of block confirmations from each of the first blockchain and the second blockchain being above a pre-defined number.

14. The system of claim 13, wherein the operations further comprise:
transmitting, by the settlement coordinator after confirming completion of the transfer, a confirmation package to each of the first counterparty and the second counterparty indicating successful completion of the transfer.

* * * * *